US006756349B2

(12) United States Patent
Smith et al.

(10) Patent No.: US 6,756,349 B2
(45) Date of Patent: Jun. 29, 2004

(54) MASKING AGENT FOR IODINE STAINS

(75) Inventors: Kim R. Smith, Woodbury, MN (US); Scott I. DeFields, Oakdale, MN (US); Sara B. Peters, Apple Valley, MN (US)

(73) Assignee: Ecolab Inc., St. Paul, MN (US)

( * ) Notice: Subject to any disclaimer, the term of this patent is extended or adjusted under 35 U.S.C. 154(b) by 49 days.

(21) Appl. No.: 10/293,794

(22) Filed: Nov. 12, 2002

(65) Prior Publication Data

US 2004/0092416 A1 May 13, 2004

(51) Int. Cl.[7] .............................. C11D 3/22; C11D 3/38; C09D 3/22

(52) U.S. Cl. ........................................ 510/214; 510/474

(58) Field of Search ................................. 510/214, 215, 510/217, 244, 385, 474

(56) References Cited

U.S. PATENT DOCUMENTS

| | | | | |
|---|---|---|---|---|
| 4,131,585 A | | 12/1978 | Feigin | |
| 4,828,569 A | | 5/1989 | Heath et al. | |
| 5,037,485 A | * | 8/1991 | Chromecek et al. ........... | 134/7 |
| 5,385,604 A | | 1/1995 | Ainslie | |
| 5,522,580 A | | 6/1996 | Varner, Jr. et al. | |
| 5,669,937 A | | 9/1997 | McBride et al. | |
| 6,309,471 B1 | | 10/2001 | Smith et al. | |

OTHER PUBLICATIONS

"Iodine Stains on Hard Surface Floors," [online] Michigan State University Extension, East Lansing, MI [retrieved on Nov. 11, 2002]. Retrieved from the Internet: <URL: http://www.msue.msu.edu/msue/imp/mod02/01500354.html>.

"Removal and Prevention of Betadine and Iodine Stains," [online] The Domco Tarkett Group, Whitehall, PA [retrieved on Nov. 11, 2002]. Retrieved from the Internet: <URL: http://www.tarkettna.com/documents/care__maintanance/remove__prevent__stain .pdf>.

Bertand, Gary L., "Iodine Clock Reaction," [online] Department of Chemistry, University of Missouri, Rolla, MI [retrieved on Nov. 11, 2002]. Retrieved from the Internet: <URL:http://web.umr.edu/~gbert/IClock/discussion.htm>.

Enter, Melissa, "Art Recipes" [online] Child Care Friends, Mankato, MN [retrieved on Nov. 11, 2002]. Retrieved from the Internet: <URL:http://childcarefriends.com/art__recipes.htm>.

Lowinsohn, Denise et al., "Coulometric Titrations in Wine Samples: Studies on the Determination of S(IV) and the Formation of Adducts," *Journal of Chemical Education* (Oxford, OH) 79(1):103–105 (Jan. 2002).

Mori, Yumiko "Bubbles," *The Chemistry Education Journal* [published online], Utsunomiya University (Utsunomiya, Japan) [retrieved on Nov. 11, 2002]; vol. 2, Dec. 15, 1994. Retrieved from the Internet: <http://member.nifty.ne.jp/kume/naru/002/naru002e.html>.

Schiff, Nathan, "All About Starch," [online] Schiff Consulting, Ontario, Canada [retrieved on Nov. 11, 2002]. Retrieved from the Internet: <URL:http://www.schiff–consulting.com/Laundrystarch.htm>.

Yeoman, EC "The History of Iodine and Povidone–Iodine," [online] e–jottings about Tissue Viability, London, England, [retrieved on Nov. 12, 2002]. Retrieved from the Internet: <URL:http://www.greenfingerslandscaping.com/wounds/html/pi.html.

* cited by examiner

*Primary Examiner*—Gregory Delcotto
*Assistant Examiner*—John M Petruncio
(74) *Attorney, Agent, or Firm*—IPLM Group, P.A.

(57) ABSTRACT

Iodine and iodophor stains are masked by applying to the stain sufficient starch to impart a bluer coloration to and thereby mask the stain. The masked stain can be left as is until further cleaning or other surface repair or replacement can take place. The masked stain may instead or also be subjected to the action of a suitable decolorizing agent. Meanwhile, the masked stain typically will be much less objectionable in appearance than the original stain.

11 Claims, No Drawings

MASKING AGENT FOR IODINE STAINS

TECHNICAL FIELD

This invention relates to stain removal and stain treatment.

BACKGROUND

Products containing iodine or iodophors (complexes of iodine with a suitable carrier) are widely used in hospitals, clinics, nursing homes and other health care facilities. These products can quickly reduce microbial populations on skin, gums, and other tissues or surfaces. Unfortunately, when iodine- or iodophor-containing products are spilled or otherwise unintentionally contact surfaces such as tile floors, they can cause semi-permanent dark yellow or brown stains. These stains can be very difficult to remove using traditional cleaning and laundering techniques, and are especially difficult to remove from floor tiles. For example, when iodophors formed from a complex of iodine and polyvinylpyrrolidonc are spilled on vinyl composite tiles coated with a typical floor finish, both the finish and tiles may stain. Removal of such stains may require recoating the floor or even replacing the stained tiles. This can require substantial time and expenditure.

U.S. Pat. No. 5,385,604 describes a germicide-resistant floor polish. U.S. Pat. Nos. 4,828,569, 5,522,580, 5,669,937, 6,309,471 describe various cleaners for iodine or iodophor stains. Iodine or iodophor stains can also be removed by scrubbing the stain with a paste or solution of sodium thiosulfate.

Iodine and iodophor stains indicate that spillage or other mistakes may have taken place, are highly visible, and may remind viewers of blood or other bodily fluids. Accordingly, such stains are very undesirable in a health care facility.

SUMMARY OF THE INVENTION

The present invention provides, in one aspect, a method for reducing the visual impact of an iodine or iodophor stain comprising applying to the stain sufficient starch to impart a bluer coloration to and thereby mask the stain. The masked stain can be left as is until further cleaning or other surface repair or replacement can take place. The masked stain may instead or also be subjected to the action of a suitable decolorizing agent.

In another aspect, the invention provides a surface cleaning composition comprising detergent, starch and a reducing agent having a redox potential sufficient to decolorize an iodine or iodophor stain.

In yet another aspect, the invention provides a floor optionally bearing a floor finish coating, an iodine or iodophor stain on the floor or floor finish coating, and a further coating containing sufficient starch to impart a bluer coloration to the stain.

The invention can minimize the visual impact of an iodine or iodophor stain until the stain can be removed or decolorized. The starch reacts with triiodide anion in the stain to change the stain coloration from a yellowish hue (e.g., yellow-white, yellow or brown) towards a bluer hue (e.g., white, blue-white, blue or even dark blue). The shift in stain coloration is perceived by the human eye as making the stained surface cleaner in somewhat the same way the human eye perceives fabric treated with a fabric bluing agent as being cleaner.

DETAILED DESCRIPTION

In this application, iodine and iodophor will (unless the context requires otherwise) collectively be referred to as "iodine".

In this application, a change in stain coloration from a yellowish hue towards a bluer hue will be referred to as "masking". For a normal viewer, the thus-masked stain typically will be much less objectionable than the original stain. This will be so even if the masking reaction makes the stain dark blue, because the shift to a bluer coloration will also be perceived as making the stained surface cleaner.

The invention can be used to mask stains caused by a wide variety of iodine-containing products. Typical iodine-containing products include tincture of iodine and Lugol's solution. The invention has particular utility for masking stains caused by iodophor-containing products. Iodophors are complexes of iodine with polymers such as polyvinyl pyrrolidone or polyethylene glycol, or complexes of iodine with a suitable surfactant. Iodine complexes with polyvinylpyrrolidone are especially widely-used and are generally known as povidone-iodine. Suitable commercially available povidone-iodine products include ALPHADINE™ solution, ointment, powder and scrub foam (all commercially available from Ecolab Inc.) and BETADINE™ antibiotics and microbicides (all commercially available from Purdue Pharma LP).

The invention can also be used to mask other problematic reducible stains that may be encountered, particularly those arising from the use of colored dyes in laboratories and certain food soils in cafeterias.

Starch for use in the invention can be obtained from a variety of sources such as rice, wheat, corn, potatoes, and the like. Depending in part on factors such as the molecular weight of the starch from such source and upon the desired degree of solubility, the starch can be used as is or hydrolyzed or emulsified as desired. Preferably the starch is hydrolyzed. Hydrolysis can be conveniently be accomplished by cooking the starch under appropriate conditions, using for example a pressure vessel and temperatures of about 100 to about 130° C. Starch can also be hydrolyzed using other techniques that will be familiar to those skilled in the art, for example by using a suitable enzyme.

In one aspect of the invention, starch is applied to an iodine stain in the form of a solution or suspension in a suitable solvent (e.g., water), without other active ingredients. This permits masking of the stain until such time as permanent stain removal or repair of the stained surface can be carried out. Such removal or replacement may take place hours later (e.g., four hours later or longer if desired), at a suitably convenient time such as after the close of a business or after departure of patients or other personnel.

In another aspect of the invention, starch is applied to an iodine stain in the presence of a reducing agent having a redox potential sufficient to decolorize an iodine or iodophor stain. This masks the stain while is being decolorized. Preferred redox potentials for the reducing agent range from +0.558 to −4.00 volts for the oxidative half-reaction at 25° C., using redox potentials such as those shown in, e.g., *Lange's Handbook of Chemistry*, 12th edition, pages 6-2 through 6-21, McGraw Hill (1979). Particularly preferred reducing agents include sulfites, hydrosulfites, nitrites, hydronitrites, phosphites and hydrophosphites, with sulfites being most preferred. A preferred amount of reducing agent is about 1 to about 10 weight percent of the solution or suspension, more preferably about 1 to about 4 weight percent and most preferably about 1 to about 3 weight percent.

The starch can also be applied to a surface that already contains a reducing agent that can decolorize the stain, as described in copending application Ser. No. 10/293,798 entitled STAIN RESISTANT COATING COMPOSITION, filed even date herewith and incorporated herein by reference in its entirety. In a preferred aspect of this copending application, a floor finish or sealer containing a reducing agent that can decolorize iodine stains is applied to a floor as one or more floor finish coats. While such a finish or sealer can provide an effective level of eventual stain control or elimination, a certain amount of time is required for decolorization to take place. The present invention can mask the stain during such decolorization.

In yet another aspect of the invention, starch is combined with a coating composition (e.g., a floor finish or other curable or hardenable film-forming composition) and then applied to a surface. The resulting coated surface can mask stains caused by iodine-containing products without application of a separate starch-containing composition to the stain. In a preferred embodiment, the coating composition also contains a reducing agent such as is described above. Starch and reducing agent can be added to such coating compositions at a variety of addition levels. For floor finish concentrates, starch preferably represents 1 to about 40 weight percent of the total concentrate weight, and preferably about 5 to about 20 weight percent. A preferred amount of reducing agent is about 1 to about 60 weight percent, more preferably about 1 to about 30 weight percent and most preferably about 1 to about 25 weight percent. For floor finish compositions diluted to use solutions (e.g., using water), a preferred starch content is about 0.1 to about 5 weight percent, more preferably about 0.5 to 2 weight percent. A preferred reducing agent content in such diluted solutions is greater than 0.2 to about 10 weight percent, more preferably about 1 to about 4 weight percent and most preferably about 1 to about 3 weight percent.

In another aspect of the invention, starch is combined with a surface cleaning composition, e.g., a floor cleaning composition, and applied to an iodine stain. Starch can be added to such surface cleaning compositions at a variety of addition levels. For floor cleaning concentrates, starch preferably represents 1 to about 40 weight percent of the total concentrate weight, and preferably about 5 to about 20 weight percent. For floor cleaning compositions diluted to use solutions (e.g., using water), a preferred starch content is about 0.1 to about 5 weight percent, more preferably about 0.5 to 2 weight percent. Formulations for suitable surface cleaning compositions will be familiar to those skilled in the art. Such compositions may contain nonionic, cationic, anionic, or amphoteric surfactants and mixtures thereof, builders (e.g., ethylene diamine tetraacetic acid ("EDTA"), citrate and the like), antimicrobial agents (e.g., quaternary ammonium compounds, phenolics and the like), pH modifiers (e.g., caustics, silicates, acids and the like), solvents, viscosity modifiers, anti-redeposition agents (e.g., polyacrylates and the like), and aesthetic modifiers (e.g., dyes, fragrances and the like).

In yet another aspect of the invention, starch and a reducing agent having a redox potential that will decolorize an iodine stain can be incorporated into a surface cleaning composition. The resulting composition can be used to clean an iodine-stained surface and mask the stain while decolorizing it. For surface cleaning composition concentrates, starch preferably represents 1 to about 30 weight percent of the total concentrate weight, and preferably about 5 to about 20 weight percent. A preferred amount of reducing agent is about 1 to about 50 weight percent, more preferably about 1 to about 30 weight percent and most preferably about 1 to about 25 weight percent. For surface cleaning compositions diluted to use solutions (e.g., using water), a preferred starch content is about 0.1 to about 5 weight percent, more preferably about 0.5 to 2 weight percent. A preferred reducing agent content in such diluted solutions is greater than 0.2 to about 10 weight percent, more preferably about 1 to about 4 weight percent and most preferably about 1 to about 3 weight percent.

Starch may be incorporated into the above-described compositions at any stage of the composition's manufacture. The starch may be added as a solid, powder, crystalline material, agglomerate, or solution. Solvents (e.g., glycol ethers, alcohols, water and the like), pH modifiers (e.g., caustics, etc) or hydrotropes (e.g., sodium xylene sulfonate, potassium cumene sulfonate, octyldimethylamine oxide, monoethanolamine, diethanolamine, triethanolamine, ammonia or ammonium salts and the like) may be added if desired to assist in solubilizing or emulsifying the starch.

The compositions of the invention can also include product packaging for one-part or two-part forms of the product, instructions for use, and a suitable applicator. Such packaging can be in the form of a power pack for addition to an existing product, e.g., a floor cleaning product.

Application of a starch-containing composition of the invention to an iodine stain imparts a bluer coloration to the stain than would be obtained in the absence of starch. In a similar fashion, application of an iodine-containing product to a starch-containing composition of the invention results in a stain having less yellow coloration than would be obtained in the absence of starch. The presence of such bluer coloration can be detected using ordinary observation or using measuring instruments. The thus-masked stain does not have to be visibly blue in hue. It may in fact be white or no longer visible at all under appropriate application and viewing conditions.

The starch-containing compositions of the invention can be applied and removed using a variety of methods and devices that will be familiar to those skilled in the art. For example, such compositions may be applied using techniques such as mopping (e.g., with flat or conventional mops), spraying, wiping, autoscrubbing (e.g., using combination equipment for carrying out mechanical floor cleaning and other functions such as mechanical floor cleaning/coating or coating/burnishing equipment) or flood coating. Mop application is preferred for coating floors.

When applying starch-containing coating compositions of the invention to a substrate, the substrate typically is first cleaned and any loose debris removed. One or more coats of the coating composition (e.g., one to five coats) arc applied to the substrate, and allowed to dry. Each coat preferably will have a dry coating thickness of about 0.1 to about 100 micrometers, more preferably about 2.5 to about 20 micrometers. Preferably the overall coating thickness will be about 5 to about 150 micrometers, more preferably about 5 to about 40 micrometers. The surface of tile hardened coating composition may be renewed using techniques such as buffing/burnishing, cleaning, or by applying a suitable restorer, e.g., a floor finish restorer.

The compositions of the invention can be applied to a variety of stained or stainable surfaces including floors (e.g., in hospitals, clinics, nursing homes, doctors' offices, dentists' offices, veterinarians' offices, milking parlors and the like), non-floor architectural surfaces (e.g., walls, ceilings, countertops, cabinets and the like), ambulance interiors, and fabrics (e.g., hospital linens including sheets, gowns, drapes and other textile products). The compositions of the invention can mask stains caused by procedures such as surgical scrubs, skin preparation, teat dips, and other activities where iodine-containing products are used.

The invention is farther illustrated in the following non-limiting examples, in which all parts and percentages are by weight unless otherwise indicated.

EXAMPLE 1

Masking of Iodine Stain on a Conventional Finish

A conventional floor finish (GEMSTAR LASER™ floor finish, commercially available from Ecolab, Inc.) was applied to a white vinyl composite tile floor and allowed to dry. A section of the floor finish was treated with 5% povidone-iodine and then rinsed with water. A prominent dark yellow stain appeared. A solution of 2% starch was wiped onto the stain. This turned the stain dark blue. No effect was noted on the unstained areas contacted by the starch solution. The stained area was wiped with paper towels to remove excess starch solution. This revealed an apparently unstained floor whose previously stained area now appeared white in color. A blue coloration transferred from the stained area to the towels.

When the floor was later mopped with water alone, the starch was removed and the yellow stain once again became apparent, at approximately the intensity of the original stain. No film damage was noted for the starch-treated section after rinsing. This demonstrates that a composition of this invention can temporarily mask iodine stains without any apparent film damage.

EXAMPLE 2

Masking of Iodine Stain on Finish Containing a Reducing Agent

The floor finish used in Example 1 was modified by adding 2% sodium sulfite. The modified finish was applied to the floor used in Example 1 and allowed to dry. The finish was treated with 5% povidone-iodine and water rinsed to afford a dark yellow stain which quickly decolorized. The stain/rinse cycle was repeated on the same section of the floor three additional times until the rate of decolorization became very slow. A solution of 2% starch was then wiped onto the stain turning it a dark blue and the excess blue wiped away, affording what seemed to be a clean floor tile. When the floor was later mopped with water alone, residual starch was removed and the floor had an unstained appearance. No film damage was noted for the starch-treated section after rinsing. This demonstrates that the composition of this invention can temporarily mask iodine stains while the stain is slowly decolorized by a reducing agent.

EXAMPLE 3

Masking of Iodine Stain on Finish Containing Starch and a Reducing Agent

Three coats of the modified floor finish of Example 2 were applied to half of a vinyl composite floor tile. The modified finish of Example 2 was further modified by adding 1% starch, then applied to the other half of the tile. The tile was rinsed under a water tap for 4 hours to minimize the amount of sodium sulfite on the exposed surface of the tile. Both halves of the tile were treated with a 5% solution of povidone-iodine. A prominent dark yellow stain remained on both halves after a water rinse. On the sulfite-only half, the stain slowly decolorized overnight to afford an apparently stain-free surface. On the sulfite and starch half, the yellow stain quickly turned a very pale blue. When a portion of the blue area was wiped with a wet towel, it appeared white and showed a yellow color only after a thorough water rinse to remove the starch. After sitting overnight, the unwiped portion of the blue area had turned colorless and did not reform a yellow color after a water rinse. No film damage was noted on either hall after rinsing. This demonstrates that a coating composition of this invention containing both a reducing agent and starch can employ the starch to mask the color of a floor stain while the reducing agent acts on the stain to decolorize it.

EXAMPLE 4

Masking of Iodine Stain Using Surface Cleaning Composition Containing Starch and a Reducing Agent The conventional floor finish of Example 1 was applied to a white vinyl composite floor tile and allowed to dry. A section of the floor finish was treated with 5% povidone-iodine and then rinsed with water. A prominent dark yellow stain appeared. A solution of 1% starch and 5% sodium sulfite was wiped onto the stain. This turned the stain pale blue. No effect was noted on the unstained areas contacted by the starch and sulfite solution. Half of the treated stained area was wiped with paper towels to remove excess starch solution. This revealed an apparently unstained finish whose previously stained area now appeared white in color. A blue coloration transferred from the stained area to the towels. The unwiped portion of the treated area was pale blue, and was allowed to stand overnight.

The next day the unwiped portion had turned from pale blue to white. The entire tile was rinsed with water, thereby removing excess starch and sulfite and yielding a white and apparently stain-free tile. No film damage was noted for the starch-treated section after rinsing. This demonstrates that a cleaning composition of this invention which contains reducing agent and starch can temporarily mask iodine stains without any apparent film damage while the reducing agent decolorizes the stain. This also demonstrates that it is not necessary to remove the starch mask in order to obtain an apparently stain-free floor.

Various modifications and alterations of this invention will be apparent to those skilled in the art without departing from the scope and spirit of this invention. It should be understood that this invention is not limited to the illustrative embodiments set forth above.

We claim:

1. A surface cleaning composition comprising detergent, starch and a reducing agent having a redox potential sufficient to decolorize an iodine or iodophor stain.

2. A composition according to claim 1 in the form of a suspension or solution.

3. A composition according to claim 1 wherein the starch is hydrolyzed.

4. A composition according to claim 1 comprising about 1 to about 40 weight percent starch.

5. A composition according to claim 1 comprising about 5 to about 20 weight percent starch.

6. A composition according to claim 1 comprising water and about 0.1 to about 5 weight percent starch.

7. A composition according to claim 1 wherein the reducing agent has a redox potential from +0.558 to −4.00 volts at 25° C.

8. A composition according to claim 1 wherein the reducing agent comprises a sulfite, hydrosulfite, nitrite, hydronitrite, phosphite or hydrophosphite.

9. A composition according to claim 1 wherein the reducing agent comprises a sulfite.

10. A composition according to claim 1 comprising about 1 to about 10 weight percent reducing agent.

11. A composition according to claim 1 comprising about 1 to about 4 weight percent reducing agent.

* * * * *

UNITED STATES PATENT AND TRADEMARK OFFICE

CERTIFICATE OF CORRECTION

PATENT NO. : 6,756,349 B2
DATED : June 29, 2004
INVENTOR(S) : Smith et al.

It is certified that error appears in the above-identified patent and that said Letters Patent is hereby corrected as shown below:

Column 1,
Line 19-20, delete "polyvinylpyrrolidonc" and insert therefor -- polyvinylpyrrolidone --

Column 4,
Line 60, delete "farther" and insert therefor -- further --

Column 5,
Line 61, delete "hall" and insert therefor -- half --

Signed and Sealed this

Twelfth Day of April, 2005

JON W. DUDAS
*Director of the United States Patent and Trademark Office*